United States Patent [19]
Takahashi et al.

[11] Patent Number: 6,134,381
[45] Date of Patent: *Oct. 17, 2000

[54] VIDEO DATA RECORDING APPARATUS FOR RECORDING SEARCH DATA

[75] Inventors: Koji Takahashi; Kenichi Nagasawa, both of Kanagawa; Motokazu Kashida, Tokyo, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/692,050

[22] Filed: Aug. 2, 1996

Related U.S. Application Data

[62] Division of application No. 08/379,082, Jan. 26, 1995, Pat. No. 5,568,328, which is a continuation of application No. 08/134,471, Oct. 8, 1993, abandoned, which is a continuation of application No. 07/879,054, Apr. 30, 1992, abandoned, which is a continuation of application No. 07/386,404, Jul. 26, 1989, abandoned.

[30] Foreign Application Priority Data

Aug. 5, 1988 [JP] Japan ................................. 63-194357

[51] Int. Cl.[7] ...................................................... H04N 5/91
[52] U.S. Cl. .............................................. 386/68; 386/112
[58] Field of Search ............................... 360/22, 18, 72.1, 360/72.2; 386/112, 1, 68–70, 81–82, 95; 358/909.1, 906; H04N 5/91

[56] References Cited

U.S. PATENT DOCUMENTS

| | | | |
|---|---|---|---|
| 4,268,876 | 5/1981 | Sakamoto et al. | 386/69 |
| 4,353,098 | 10/1982 | Heinz et al. | 360/8 X |
| 4,395,738 | 7/1983 | Hedlund et al. | 358/335 |
| 4,575,772 | 3/1986 | Shimada et al. | 360/18 X |
| 4,587,577 | 5/1986 | Tsunoda | 386/69 |
| 4,623,941 | 11/1986 | Juso et al. | 360/18 |
| 4,656,536 | 4/1987 | Furumoto et al. | 360/72.2 |
| 4,758,904 | 7/1988 | Takahashi et al. | 360/19.1 |
| 4,772,960 | 9/1988 | Takahashi et al. | 360/18 |
| 4,791,512 | 12/1988 | Takahashi et al. | 360/10.2 |
| 4,799,111 | 1/1989 | Ito | 360/18 |
| 4,811,123 | 3/1989 | Yoshinaka | 360/26 |
| 4,833,549 | 5/1989 | Yoshimoto et al. | 360/18 X |
| 4,860,125 | 8/1989 | Van Der Meer | 360/13 |
| 4,887,169 | 12/1989 | Bannai et al. | 386/69 |
| 4,914,527 | 4/1990 | Asai et al. | 360/32 X |
| 4,920,435 | 4/1990 | Yamazaki | 360/77.15 |
| 5,097,363 | 3/1992 | Takei et al. | 360/10.3 |

FOREIGN PATENT DOCUMENTS 360172892  9/1985  Japan .

*Primary Examiner*—Wendy Garber
*Assistant Examiner*—Vincent F. Boccio
*Attorney, Agent, or Firm*—Robin, Blecker & Daley

[57] ABSTRACT

A video data recording apparatus which records video data by forming a number of tracks parallel with each other on a recording medium, wherein a period at which each of the tracks is formed is not one integral-number-th of a period of time for which a field of video signal is recorded, and wherein a time code is recorded at a constant position of each of the tracks.

10 Claims, 7 Drawing Sheets

VIDEO DATA RECORDING APPARATUS FOR RECORDING SEARCH DATA

This application is a division, of application Ser. No. 08/379,082, filed Jan. 26, 1995, now U.S. Pat. No. 5,568,328 which is a continuation of Ser. No. 08/134,471, filed Oct. 8, 1993, abandoned, which is a continuation of Ser. No. 07/879,054, filed Apr. 30, 1992, abandoned, which is a continuation of Ser. No. 07/386,404 filed Jul. 26, 1989, abandoned.

BACKGROUND OF THE INVENTION

1. Field of the Invention

This invention relates to a video data recording apparatus, particularly a video data recording apparatus for recording video data and search data.

2. Description of the Related Art

VTRs (Video Tape Recorders) have been publicly known as apparatuses for recording video data. In recent years, digital VTRs have been also publicly known which employ a digital recording method. These digital VTRs convert video information into digital signals, and record them on magnetic tapes after having processed them by high-efficiency compression encoding, error-correction encoding and the required modulation. To reproduce records on magnetic tapes, they demodulate the signals reproduced by their corresponding reproducing heads, correct any errors caused by the magnetic tapes (for example, due to dust or flaws on the tapes) by using error-correction codes, and decode the corrected signals to restore the recorded video information.

These conventional digital video data recording apparatuses are designed so as to record a picture of video data on plural tracks in the recording track pattern as shown in FIG. 1. For example, video signals in the first field are recorded on tracks T1, T2 and T3, and those in the second field are recorded on tracks T4, T5 and T6. Signals are thus distributed on plural tracks corresponding to a picture of video data for the purposes of processing many data of digital video signals and implementing a search facility and special reproducing facilities such as slow reproduction and search reproduction easily.

In recent years, the high-efficiency video data encoding technology has been rapidly advanced mainly in the telecommunication fields such as television conference system and television telephone system. And digital VTRs have encountered an increasing demand for the long-time recording capability. Therefore, it is expected that the high-efficiency video data encoding technology will be applied to digital VTRs to increase the recording time in the digital VTRs. Even if the recording time is a little increased, no ratio of whole numbers may be obtained in a vertical synchronizing period between rotary head rotation and video signal, or the vertical synchronizing signals for rotary head rotation and video signal may be asynchronized by variable-length encoding and time-base correlation processing. In this case, the following problem is encountered. Considering a high-speed search function to identify the address of each picture element in video signals in reference to a vertical synchronizing signal, it is necessary for the vertical synchronizing signal to be located at a constant position on every track in the recording track pattern of a recording medium. However, the recording positions of vertical synchronizing signals are different between tracks, if the recording time is longer. In short, it is more difficult to implement the special reproducing and picture search facilities, if the recording time is longer as possible.

SUMMARY OF THE INVENTION

An object of this invention is to solve these problems.

Another object of this invention is to provide a video data recording apparatus in which it is not necessary to record a field of video data at a longitudinally uniform position on each track, and in which video data is recorded so as to be able to search for any recorded pictures easily.

As an embodiment according to this invention to attain these objects, a video data recording apparatus for recording video data by forming a number of tracks on a recording medium is provided which comprises: first means for forming main video data as main data to be recorded; second means for forming search data to be used for searching for the main video data, the search data including a time code; head means for recording the main video data and the search data by forming a number of tracks on the recording medium, a period at which each of the tracks is formed by the head means being not one integral-number-th of a period of time for which a field of the main video data is formed; and timing control means for supplying the search data to the head means at a timing at which the search data is recorded at a constant position of each of the tracks.

Further another object of this invention is to provide a video data recording apparatus in which pictures can be easily searched for even if the recording position for a field of video data is not longitudinally uniform on every track.

As an embodiment according to this invention to attain this object, a video data recording apparatus for recording video data by forming a number of tracks on a recording medium is provided which comprises: first means for forming main video data as main data to be recorded; second means for forming search data to be used for searching for the main video data; transporting means for transporting the recording medium; recording means for recording the main video data and the search data by forming a number of tracks on the recording medium being transported by the transporting means at a first speed, the recording means including at least one head, a period at which each of the tracks is formed by the head being not one integral-number-th of a period of time for which a field of the main video data is formed; timing control means for supplying the search data to the head at a timing at which the search data is recorded at a constant position of each of the tracks; and reproducing means for reproducing the search data from the recording medium being transported by the transporting means at a second speed higher than the first speed.

These and other objects and features of this invention will be better understood by reading the detailed description of the preferred embodiments according to this invention, as given below, on referring to the drawings annexed hereto.

DETAILED DESCRIPTION OF THE PREFERRED EMBODIMENTS

The preferred embodiments of this invention will be described below in reference to the drawings annexed hereto.

Figure 1:
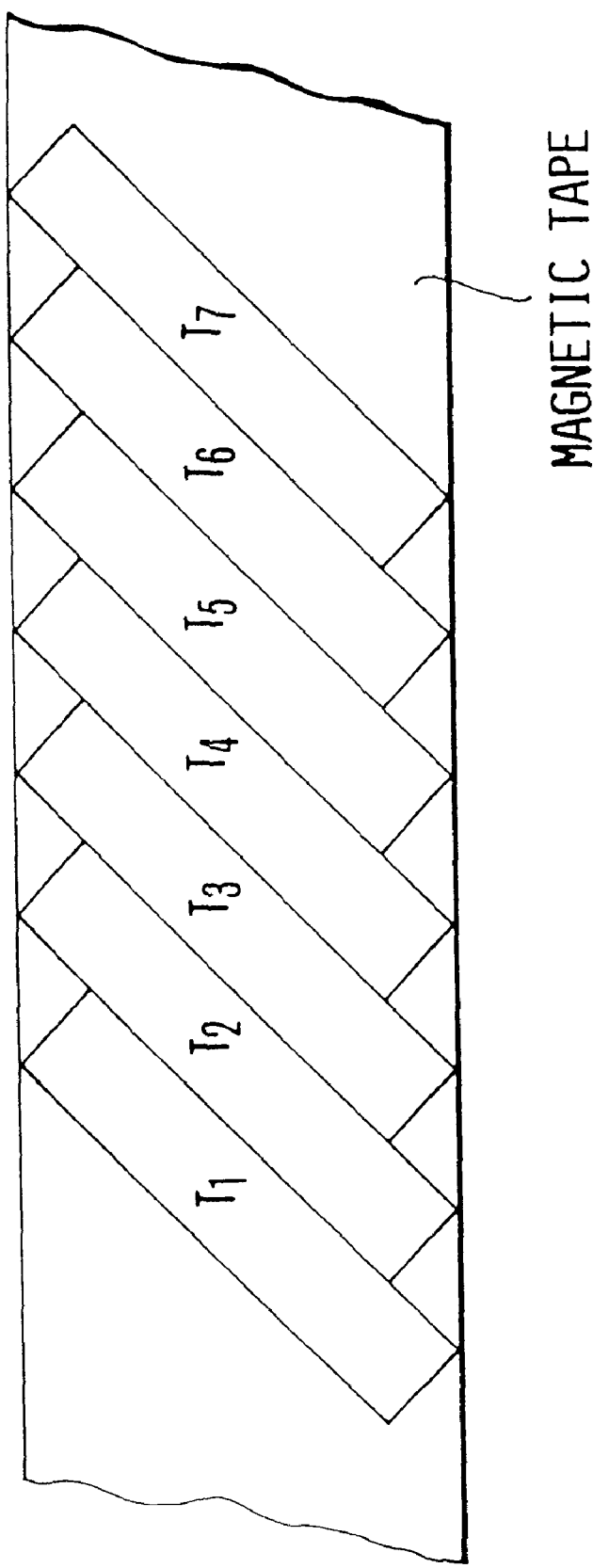
FIG. 1 shows a typical recording track pattern used in the conventional video data recording apparatuses.
Figure 2:
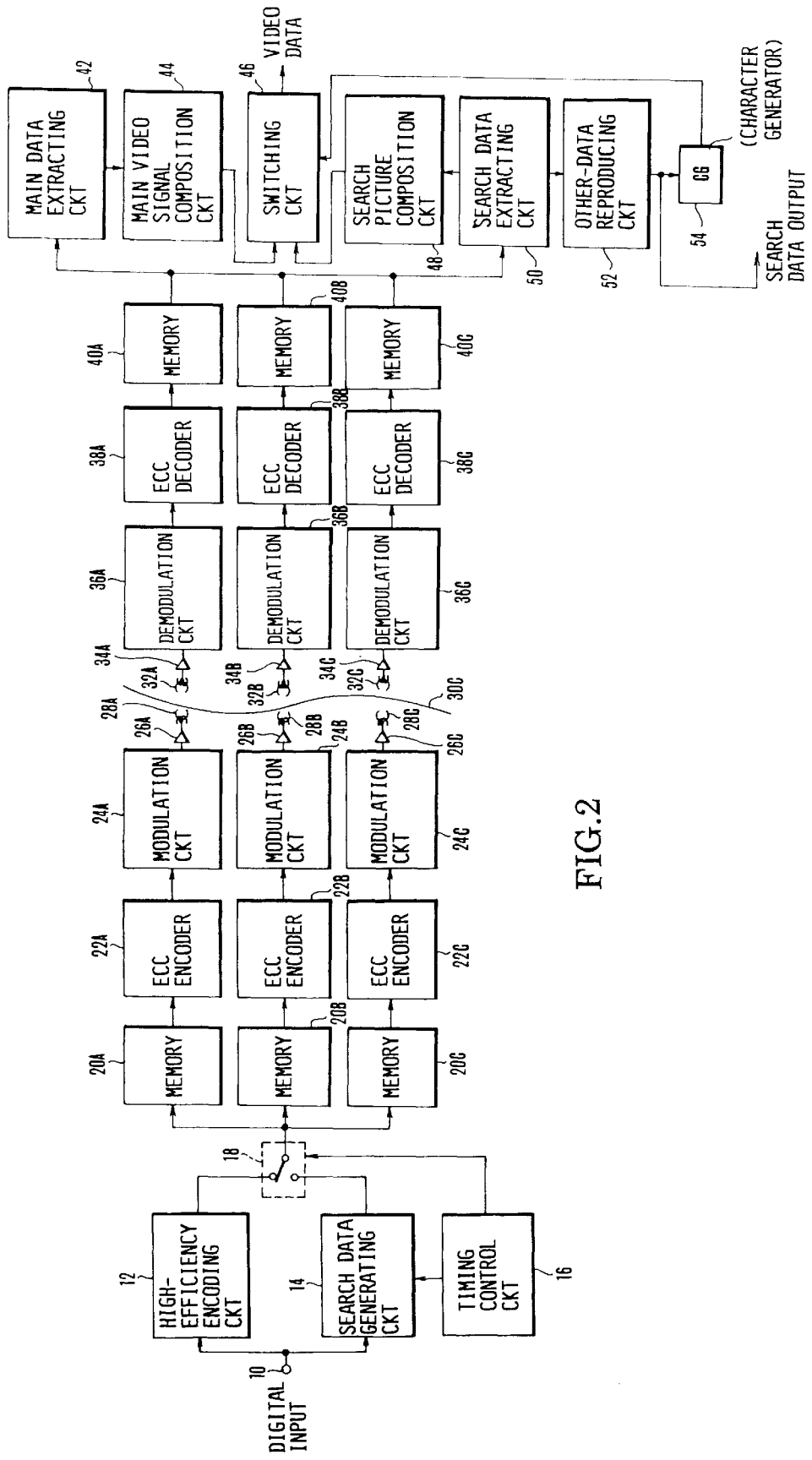
FIG. 2 is a block diagram showing the schematic configuration of a digital VTR signal processing unit as an embodiment according to this invention.

FIG. 2 is a block diagram showing the configuration of an embodiment according to this invention. In this figure, digital video data (for example, information from a digital video telecommunication network) is received by an input terminal 10. The input data is supplied to a high-efficiency encoding circuit 12 and a search data generating circuit 14. The high-efficiency encoding circuit 12 processes the input data by the non-fixed-length encoding (or the variable-length encoding in which the amount of data per field is variable according to the contents of video information) which is represented by an encoding method using the picture timebase correlation, which is implemented, for example, in an inter-frame encoder. This circuit 12 is equipped with a buffer memory on its output step to produce an output at a constant data rate (i.e. amount of data per time unit).

Figure 3:
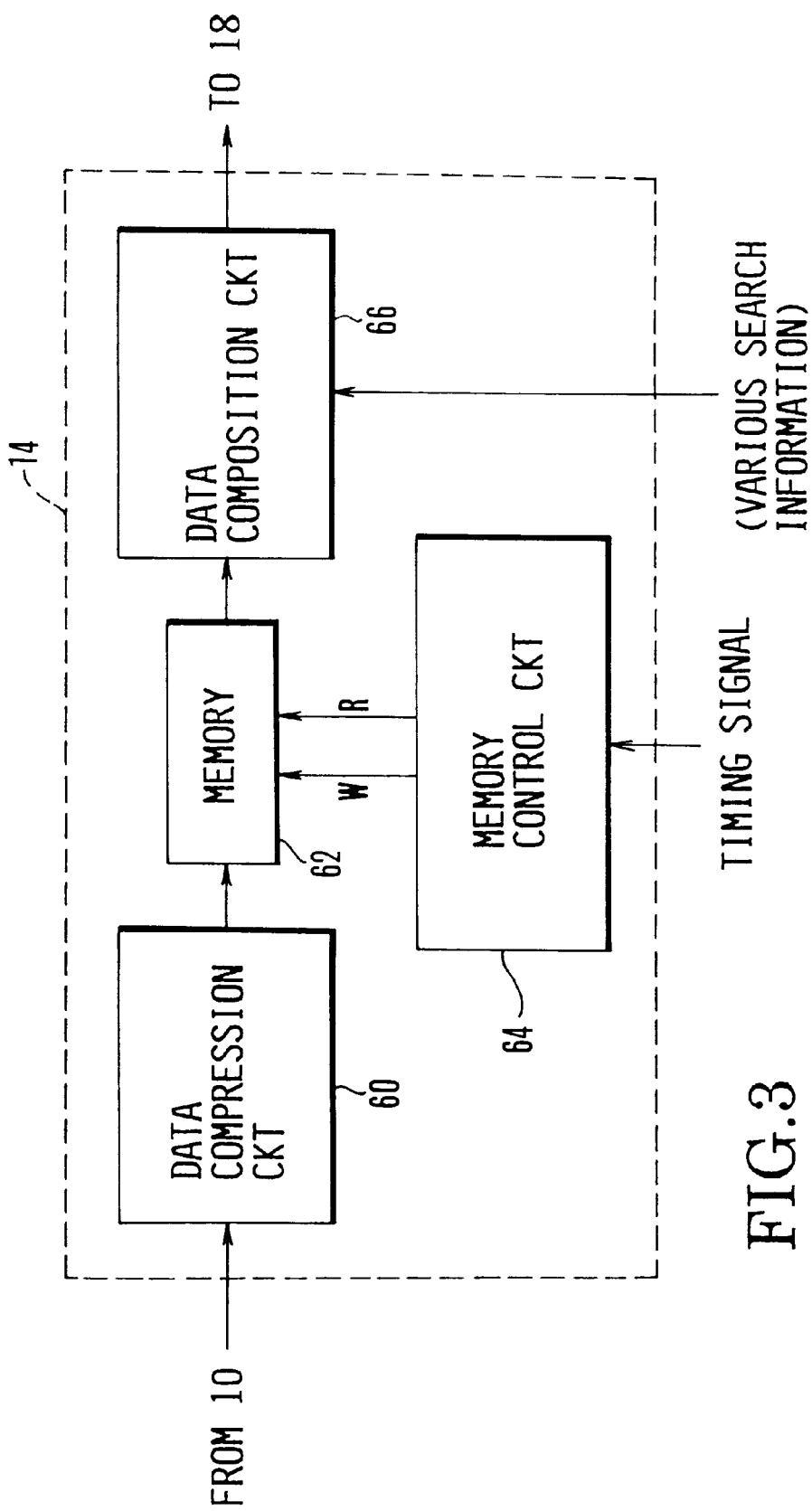
FIG. 3 is a block diagram showing the configuration of a search data generating circuit in the signal processing unit as shown in FIG. 2.
Figure 4:
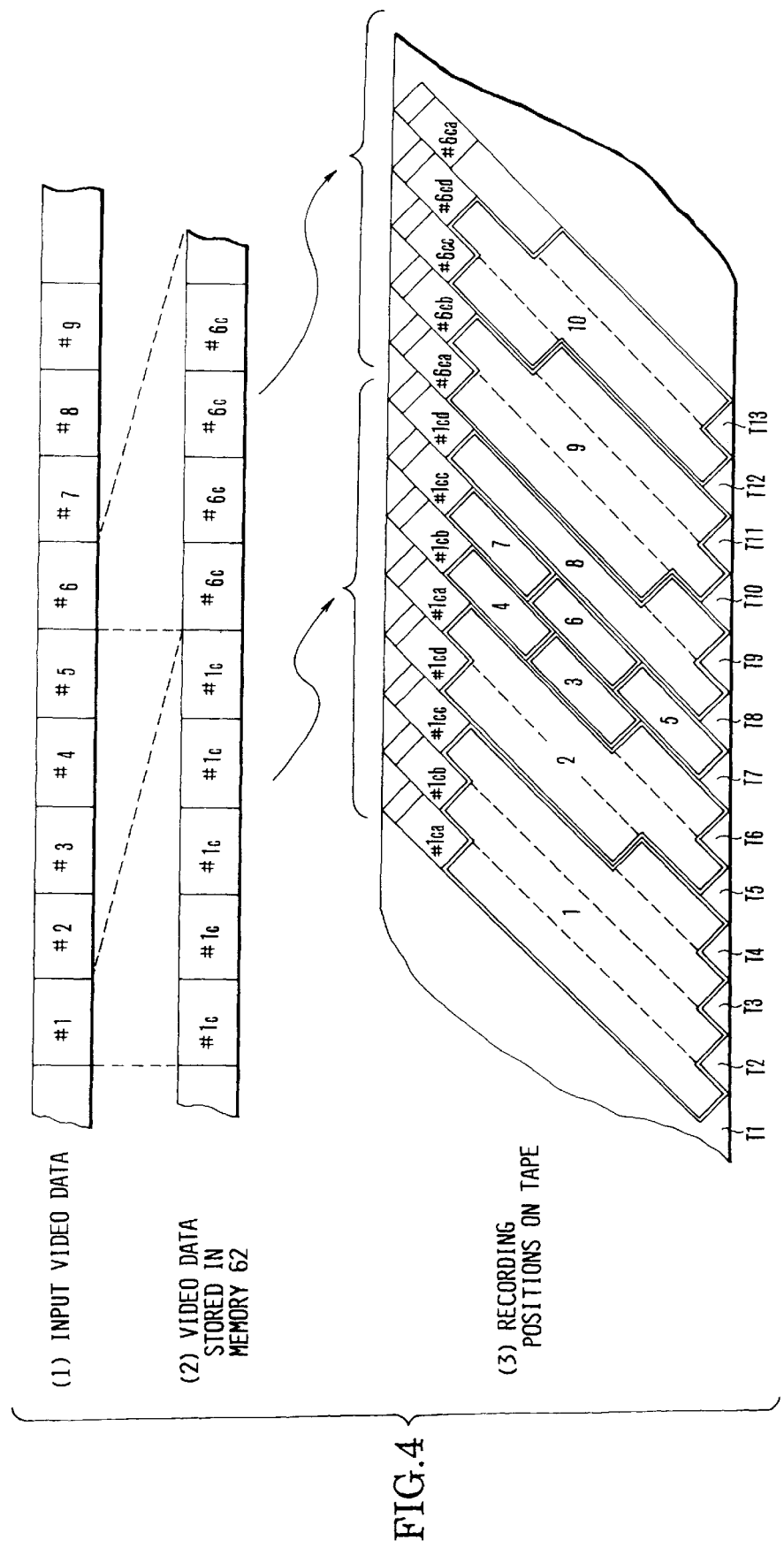
FIG. 4 shows the procedure of forming search video data in the digital VTR as shown in FIG. 2.

The search data generating circuit 14 generates various search data, for example, search video data as described hereinafter, time information such as date of year, month and day, and time codes, index information such as program numbers, scene numbers and cut numbers, and data category information such as data sources, properties and objects. FIG. 3 shows an example of the search data generating circuit 14 and FIG. 4 shows the procedure of forming search video data. In FIG. 3, video data from the input terminal 10 is applied to a data compression circuit 60 in which the input data is compressed or reduced by a technique such as sub-sampling. In the data compression circuit 60, such a data reduction rate may be applicable that can produce about ¼ to ¹/₁₀ the amount of data reduced by the high-efficiency encoding circuit 12. However, it is desirable that the data compression rate is selected according to a system to be constructed. For example, it is higher for a higher-speed search, lower for a higher quality of pictures, and higher for a smoother scrolling of pictures on search.

The output of the data compression circuit 60 is applied to a memory 62, which stores one picture in several fields (#1 and #6 in FIG. 4) with a write control (W) signal from a memory control circuit 64. The time resolution is determined by the time intervals at which the data is stored in the memory 62. FIG. 4, part (1) shows the input video data of the data compression circuit 60, FIG. 4, part (2) shows the compressed data to be stored in the memory 62 (#1c and #6c in the figure, wherein the subscript "c" indicates that the video data has been compressed), and FIG. 4, part (3) shows the record layout on a magnetic tape. The memory control circuit 64 controls the memory 62 so that this memory will output the stored video data by the same number of times as the number of fields which were suppressed or not written in the memory 62 (that is, the number of fields deleted). Therefore, the memory 62 outputs the same video data 5 times in the example as shown in FIG. 4.

A data composition circuit 66 combines various search data (such as time information, index information and classification information) as described above, corresponding to the output pictures from the memory 62. The output of the data composition circuit 66 is that of the search data generating circuit 14.

The search data generating circuit 14 outputs the search data to a switch 18 according to a timing signal from a timing control circuit 16. The output of the high-efficiency encoding circuit 12 is also applied to the switch 18, which selects the output of the high-efficiency encoding circuit 12 (hereinafter referred to as "main data") or the output of the search data generating circuit 14 (hereinafter referred to as "sub-data") according to a switch control signal from the timing control circuit 16, and applies it to three buffer memories 20A, 20B and 20C in the corresponding recording signal processing systems. The switch 18 is operated so that the sub-data or search data is recorded at the top of each helical track in the recording layout as shown in FIG. 4, part (3), while the main data or main video data is recorded in the other region as shown in the figure.

In FIG. 4, the amount of search data (for example #1c) is divided into 4 blocks #1ca, #1cb, #1cc and #cd, which are recorded two times. These blocks are thus recorded plural times (two times here) to improve the reproducibility of this search video data during high-speed reproduction. In this case, the number of records for the same data may be related with a head azimuth angle. For example, the first records of the blocks #1ca and #1cc correspond to a plus azimuth, the second records of these blocks correspond to a minus azimuth, and the first and second records of the blocks #1cb and #1cd correspond to the minus and plus azimuths respectively.

Figure 5:
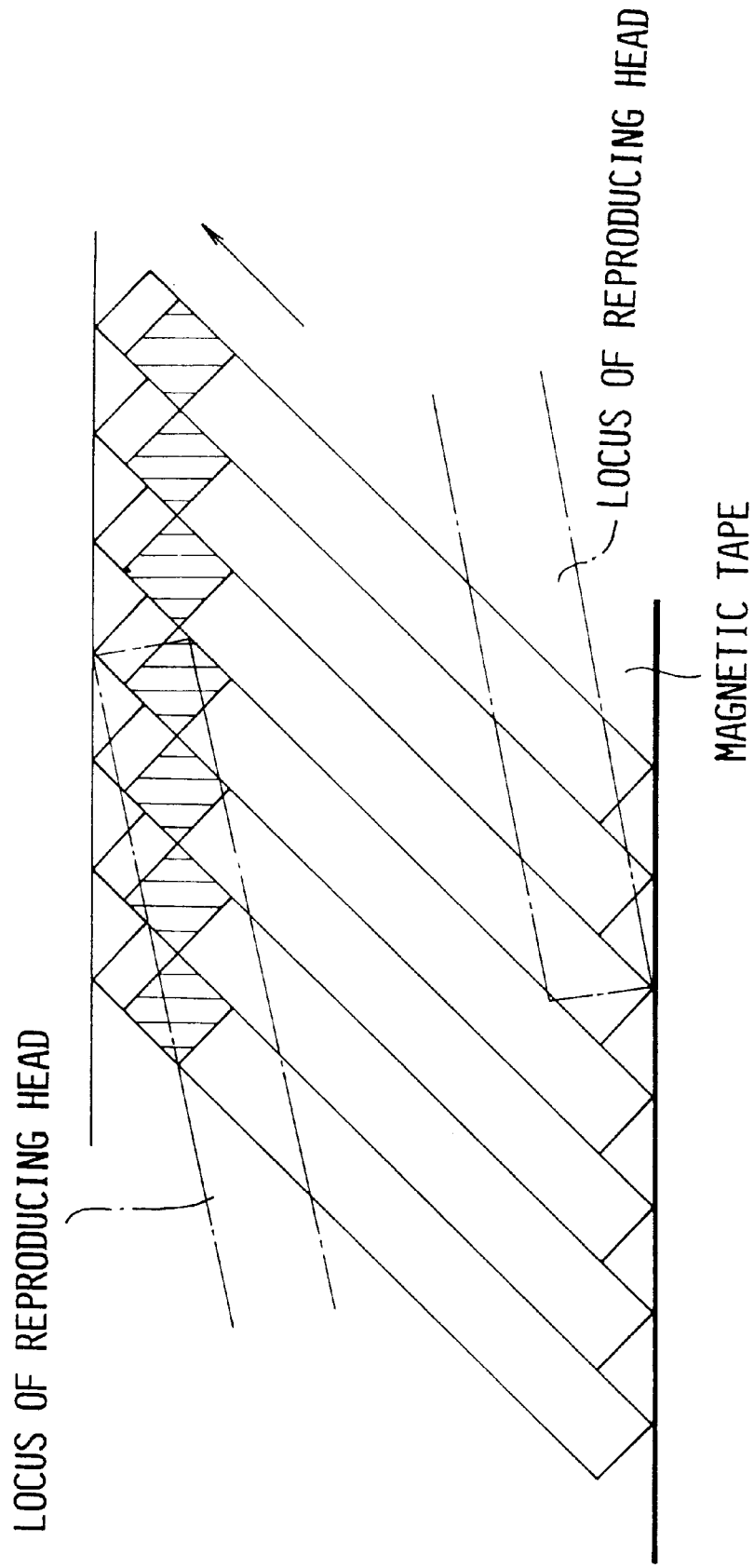
FIG. 5 illustrates the search locus of a head in the digital VTR as shown in FIG. 2.

When search data (sub-data) including search video data is thus recorded at a predetermined position in the recording pattern, the main video data (main data) can be searched for at a high speed by referring to the sub-data, even if the recording positions of the main data are variable. FIG. 5 shows the locus of a magnetic head on high-speed search. In this figure, the hatched parts indicate the recorded parts of search data.

Figure 6:
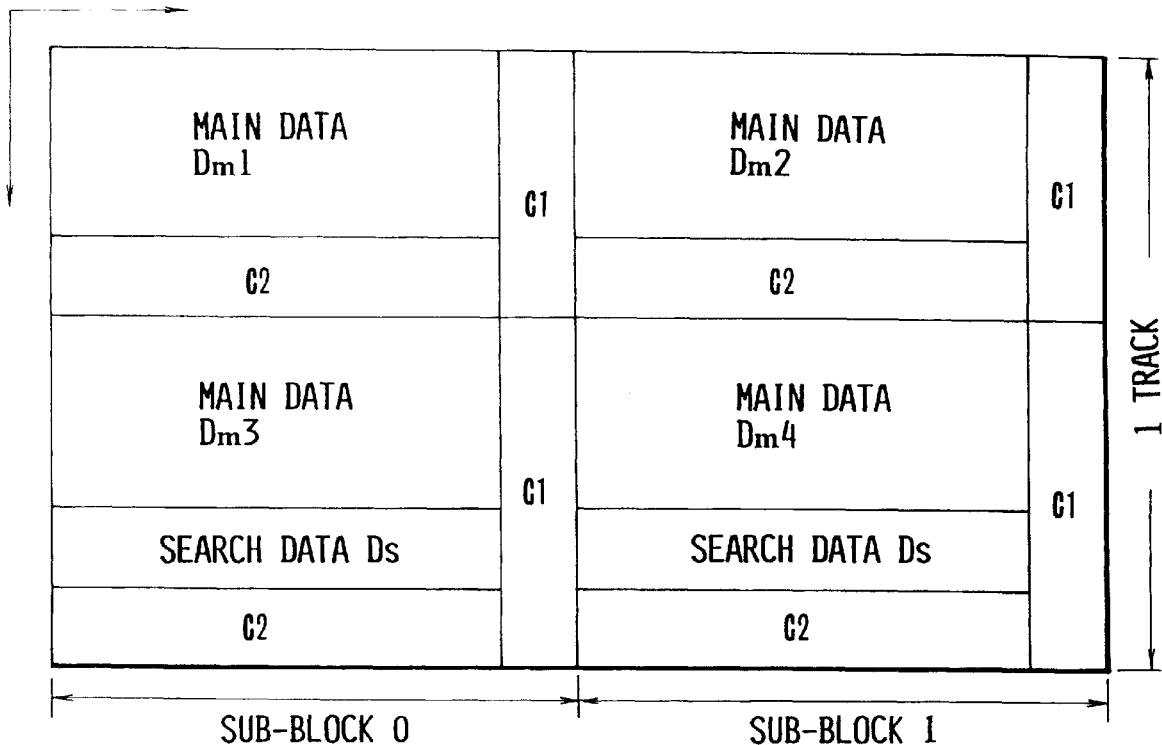
FIG. 6 shows the data layout of a memory in the digital VTR as shown in FIG. 2.
Figure 7:
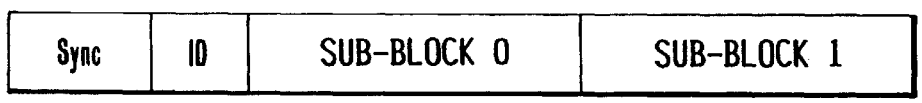
FIG. 7 shows the configuration of a synchronous block recorded by the digital VTR as shown in FIG. 2.
Figure 8:
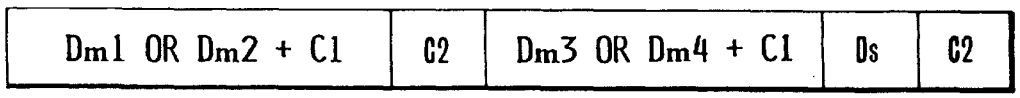
FIG. 8 shows the data configuration of a track for the data recorded by the digital VTR as shown in FIG. 2.

Next, the data layout in the buffer memories 20A, 20B and 20C will be described below. FIG. 6 shows a data layout of the memory for a track of data, FIG. 7 shows the configuration of a data block to be recorded, and FIG. 8 shows the data array in a track composed of plural recording data blocks as shown in FIG. 7. In FIG. 6, the main video data per track is divided into 4 parts Dm1, Dm2, Dm3 and Dm4 for convenience. Ds is search data (or sub-data). The parities C1 and C2 are an internal code and an external code respectively, which are used to detect and correct any data error in the data recording and reproducing system. These parities C1 and C2 are provided only as memory areas. It is ECC encoders 22A, 22B and 22C as described hereinafter that access the memory areas to form the parities C1 and C2. In FIG. 7, Sync is a synchronous data, and ID is a data block identifying signal which is used to sort and identify the main data and the sub-data, or the search video data and the other data (time, index and category information) among the sub-data.

The ECC encoders 22A, 22B and 22C form error correcting codes by using the memory areas for the parities C1 and C2, and add them to the search data. In the video data recording and reproducing system, error correcting codes, for example, interleaved with Read-Solomon codes are used. Modulation circuits 24A, 24B and 24C convert the recorded array of codes thus formed into an array of codes that is considered to have the least deterioratable frequency spectra in an electromagnetic conversion system. For example, by using an 8–9 conversion, these circuits may convert the recorded array of code into a signal which has a spectral distribution containing few DC components and low-frequency components. The outputs of the modulation circuits 24A, 24B and 24C are applied to recording rotary heads 28A, 28B and 28C through recording amplifiers 26A, 26B and 26C respectively, and recorded on a magnetic tape 30.

To simplify the illustration, the heads 28A, 28B and 28C are shown in FIG. 2 as if they were single-heads. In fact, however, the head 28A comprises a pair of rotary heads 71$a$ and 71$b$ having a 180° rotary phase difference between them. Similarly, the head 28B comprises a pair of heads 72$a$ and 72$b$, and the head 28C comprises a pair of heads 73$a$ and 73$b$. These pairs of heads will be described hereinafter by referring to FIG. 9.

In the reproducing system, the operations are opposite the those in the recording system. The recorded data on the magnetic tape 30 is reproduced by reproducing heads 32A, 32B and 32C (for which the recording heads 28A, 28B and 28C may be used), amplified by reproducing amplifiers 34A, 34B and 34C, and supplied to demodulation circuits 36A, 36B and 36C respectively. The demodulation circuits 36A, 36B and 36C process the recorded data in the reverse operating procedure of the modulation circuits 24A, 24B and 24C. Then, the ECC decoders 38A, 38B and 38C detect and correct any transmission error (for example, caused by a drop-out phenomenon due to dust or flow) in the electromagnetic conversion system by using the parity areas in the memories 40A, 40B and 40C respectively. The data layout of the memories 40A, 40B and 40C is the same as shown in FIG. 6. Of course, the recording memories 20A, 20B and 20C may be used for these memories 40A, 40B and 40C respectively.

A main data extracting circuit 42 extracts only the main data Dm1 to Dm4 from the data stored in the memories 40A, 40B and 40C, while a search data extracting circuit 50 extracts only the search data Ds. The ID signal as shown in FIG. 7 is referenced to extract these data. A main video signal composition circuit 44 composes the main video data extracted by the main data extracting circuit 42, and outputs video data corresponding to the input video signal for recording. A search picture composition circuit 48 composes the search video data extracted by the search data extracting circuit 50, and outputs video data corresponding to the output of the search data generating circuit 14. The other search data extracted by the search data extracting circuit 50 are reproduced by a reproducing circuit 52, and outputted as they are, or supplied to a character generator 54 for superimposition. A switching circuit 46 selects the output of the main video signal composition circuit 44 during the normal reproducing, while it combines the output of the search picture composition circuit 48 and the output of the character generator 54 and outputs the combined outputs during the search data reproduction.

This digital VTR signal processing circuit is controlled by a system control circuit which comprises, for example, a microcomputer, though this circuit is not shown in FIG. 2.

Figure 9:
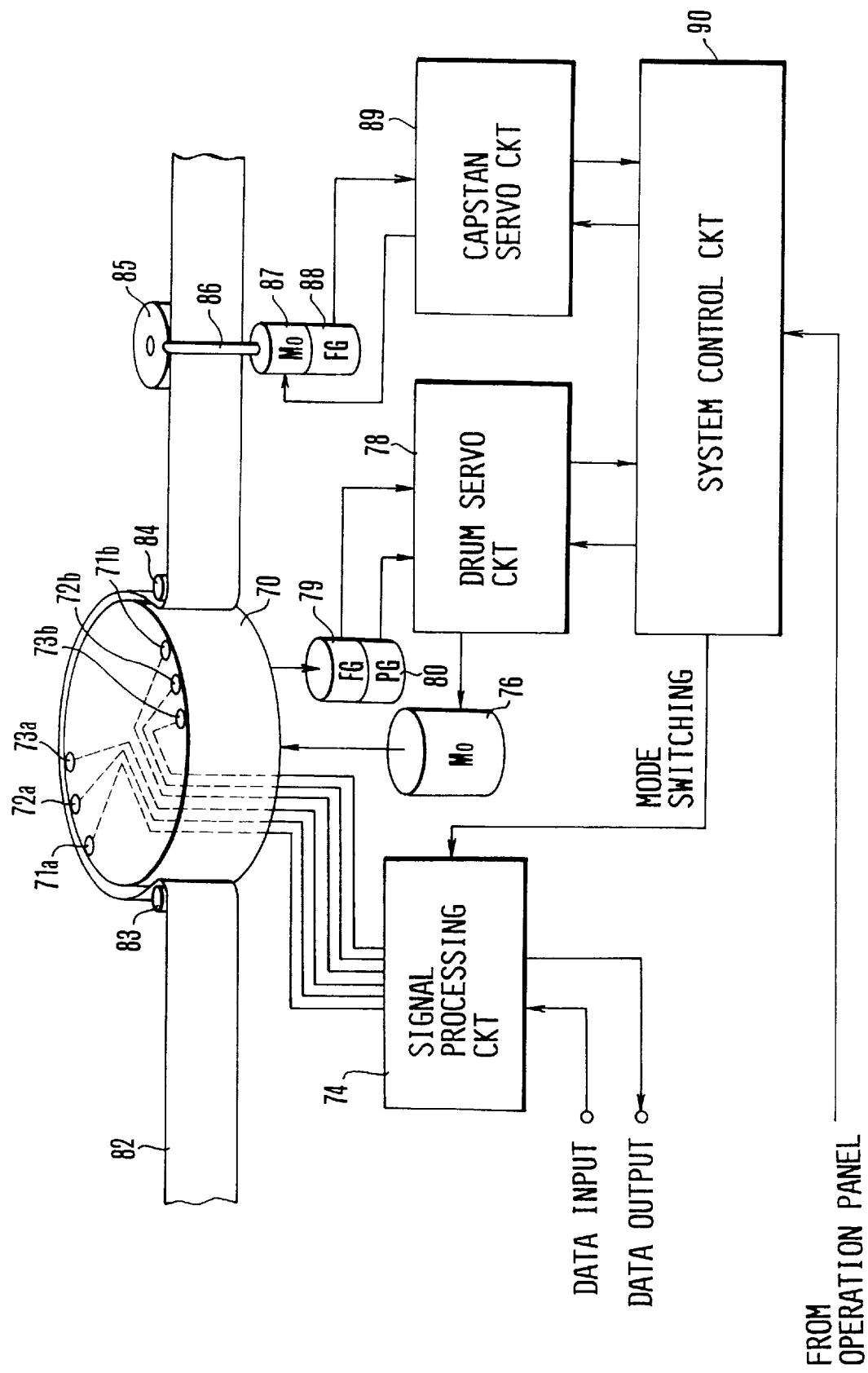
FIG. 9 is a schematic view showing the configuration of a mechanism control unit in the digital VTR is shown in FIG. 2.

Next, the mechanisms of the rotary heads and the tape transport system will be described below. In FIG. 9, a rotary drum 70 is equipped with heads 71$a$, 72$a$, 73$a$, 71$b$, 72$b$ and 73$b$. The heads 71$a$, 72$a$ and 73$a$ are opposite in azimuth to the heads 71$b$, 72$b$ and 73$b$, and the former heads are placed opposedly or at 180° to the latter heads respectively. If 6 helical tracks are formed by one rotation of the drum 70, the tracks at a plus azimuth angle are formed alternately with those at a minus azimuth angle of the same magnitude to record three channels of signals. The input/output signals of these heads are connected to a signal processing circuit 74 through a rotary transformer (not shown). The signal processing circuit 74 is a whole circuit as shown in FIG. 2. The rotary drum 70 is driven by a drum motor 76, and a drum servo circuit 78 controls the rotation of the rotary drum 70 by using the outputs of a FG pulse generating circuit 79 for detecting the rotational speed and a PG pulse generating circuit 80 for detecting the rotational phase.

A magnetic tape 82 is wound up on the rotary drum 70 by being guided by guide posts 83 and 84, and transported by a capstan motor 87 while being sandwiched, between a pinch roller 85 and a capstan 86. The operation of the capstan motor 87 is detected by a FG pulse generating circuit 88 and controlled by a capstan servo circuit 89.

A system control circuit 90 controls the servo circuits 78 and 89 and the operation mode (recording, reproducing or searching mode) of the signal processing circuit 74 according to the command coming from an external operation panel (not shown).

During search while it is necessary to transport the tape 82 at a higher speed than during the reproduction, the system control circuit 90 controls the servo circuit 90 so as to increase the rotational frequency of the motor 87. At the same time, the system control circuit 90 applies also to the servo circuit 78 a command signal to offset the rotational frequency of the rotary drum 70 so as to minimize the variation in the relative speed of a head to a helical track.

During high-speed search, the servo control is locked to maximize the reproduced outputs of the search data recording areas (or the hatched parts shown in FIG. 5). To lock the servo control, any publicly known technique may be used. For example, a technique wherein the capstan motor is controlled so as to maximize the output signal level of the timing components corresponding to the search data recording areas, taken out of the reproducing head output, or a tracking control method using multiplexed pilot signals wherein the capstan motor is controlled by using a tracking error signal which is formed from the pilot signals sampled and held among the timing components corresponding to the search data recording areas.

In this embodiment wherein a search signal is recorded at a predetermined position of each track in the recording medium and the recording tracks are formed independently of the inherent period of video information, it is possible to increase the recording time as possible and to perform a visual search. Therefore, in a television conference system, a television telephone system or a backup picture recording apparatus for satellite communication, for example, it is possible to search for any recorded picture visually at a high speed so as to improve the operability of this system or apparatus. It is also possible to record video signals having different formats such as NTSC and PAL on the same recording apparatus or tape, and search for them continuously and visually. If a huge mass of data is recorded in a data recorder of large capacity, it can be retrieved very easily by converting the measuring environment and recording conditions into the video information which is recorded in the form of search data.

From the description as given above, it will be easily understood that according to this invention, it is possible to record a search signal at a predetermined position of each track in a recording medium and form these recording tracks independently of the inherent period of video information so as to increase the recording time as possible, search for the recorded information more easily and improve the operability of the recording medium remarkably.

What is claimed is:

1. A digital video signal recording apparatus, comprising:
   a) input means for inputting a video signal;
   b) video signal forming means for forming, from the input video signal, a main video signal to be recorded, the main video signal being composed of a plurality of successive images;
   c) recording means for recording the main video signal on a recording medium in the form of a plurality of tracks;
   d) search signal forming means for forming search video signals by selecting one of a predetermined number of successive images in the main video signal at predetermined intervals; and
   e) control means for supplying the search video signals to said recording means so that the search video signal is recorded within the main video signal at regularized positions of the tracks, wherein a period for one image of the main video data is variable and is independent of a period for forming the tracks.

2. An apparatus according to claim 1, wherein the main video signal is coded by means of a variable-length coding method.

3. An apparatus according to claim 1, wherein the main video signal is coded by means of a high efficiency coding method.

4. An apparatus according to claim 3, wherein said search signal forming means forms the search video signal by extracting one image from the predetermined number of successive images in the main video signal which has been coded by the high efficiency coding method.

5. An apparatus according to claim 1, wherein said recording means records the search video signal corresponding to one image a plurality of times.

6. An apparatus according to claim 5, wherein said recording means divides the search video signal corresponding to one image into a plurality of portions and records each of the portions on one of the tracks as a unit.

7. An apparatus according to claim 6, wherein said recording means records each of the portions on one end of the tracks.

8. An apparatus according to claim 1, wherein said recording means divides the search video signal corresponding to one image into a plurality of portions and records each of the portions on one of the tracks as a unit.

9. An apparatus according to claim 8, wherein said recording means records each of the portions on one end of the tracks.

10. A digital video signal recording apparatus, comprising:
    a) input means for inputting a video signal;
    b) video signal forming means for forming, from the input video signal, a main video signal to be recorded, the main video signal being composed of a plurality of successive images;
    c) recording means for recording the main video signal on a recording medium in the form of a plurality of tracks;
    d) search signal forming means for forming search video signals by selecting one of a predetermined number of successive images in the main video signal at predetermined intervals; and
    e) control means for supplying the search video signals to said recording means so that the search video signal is recorded within the main video signal at regularized positions of the tracks and the search video signal corresponding to one image is recorded a plurality of times.

* * * * *

UNITED STATES PATENT AND TRADEMARK OFFICE
CERTIFICATE OF CORRECTION

PATENT NO.    : 6,134,381
DATED         : October 17, 2000
INVENTOR(S)   : Koji Takahashi et al.

Page 1 of 1

It is certified that error appears in the above-identified patent and that said Letters Patent is hereby corrected as shown below:

Column 4,
Line 21, delete "#cd" and insert -- #1cd --.

Signed and Sealed this

Eighteenth Day of December, 2001

Attest:

Attesting Officer

JAMES E. ROGAN
Director of the United States Patent and Trademark Office